United States Patent
Fukumoto

(10) Patent No.: US 7,948,282 B2
(45) Date of Patent: May 24, 2011

(54) TRIANGULAR-WAVE GENERATING CIRCUIT, AND INVERTER, LIGHT EMITTING DEVICE AND LIQUID CRYSTAL TELEVISION USING THE CIRCUIT

(75) Inventor: Kenichi Fukumoto, Kyoto (JP)

(73) Assignee: Rohm Co., Ltd. (JP)

( * ) Notice: Subject to any disclaimer, the term of this patent is extended or adjusted under 35 U.S.C. 154(b) by 515 days.

(21) Appl. No.: 12/159,140

(22) PCT Filed: Nov. 15, 2006

(86) PCT No.: PCT/JP2006/322772

§ 371 (c)(1),
(2), (4) Date: Jun. 25, 2008

(87) PCT Pub. No.: WO2007/058217

PCT Pub. Date: May 24, 2007

(65) Prior Publication Data

US 2010/0277090 A1    Nov. 4, 2010

(30) Foreign Application Priority Data

Nov. 16, 2005    (JP) .................................. 2005-332203

(51) Int. Cl.
*H03K 4/06*    (2006.01)
(52) U.S. Cl. .......... 327/131; 331/45; 331/111; 331/143; 363/132; 363/136; 327/24
(58) Field of Classification Search .......... 315/291–311, 315/274–287
See application file for complete search history.

(56) References Cited

U.S. PATENT DOCUMENTS

| | | | |
|---|---|---|---|
| 5,394,020 | A | 2/1995 | Nienaber |
| 6,094,081 | A * | 7/2000 | Yanagiuchi .................... 327/258 |
| 6,587,006 | B2 * | 7/2003 | Kawajiri et al. ................ 331/45 |
| 7,023,718 | B2 * | 4/2006 | Huang et al. ................... 363/132 |
| 7,339,802 | B2 * | 3/2008 | Fukumoto .................. 363/21.09 |
| 7,403,049 | B2 * | 7/2008 | Uchimoto et al. ............ 327/131 |

(Continued)

FOREIGN PATENT DOCUMENTS

JP    63-275220    11/1988

(Continued)

OTHER PUBLICATIONS

International Preliminary Report on Patentability for International Patent Application No. PCT/JP2006/322772 dated May 20, 2008 with English Translation.

(Continued)

*Primary Examiner* — Jacob Y Choi
*Assistant Examiner* — Henry Luong
(74) *Attorney, Agent, or Firm* — Cantor Colburn LLP

(57) ABSTRACT

A first comparator compares an output voltage Vout appearing at a capacitor with a maximum threshold voltage Vmax. A second comparator compares the output voltage Vout with a minimum threshold voltage Vmin. An edge detection circuit detects an edge of a synchronization signal SYNC having approximately ½ of frequency of the output voltage Vout and outputs an edge detection signal SE. A charge-discharge control unit refers to the first and the second comparison signal, and sets the charge-discharge circuit to a discharging state when the output voltage Vout becomes higher than the maximum threshold voltage Vmax and sets the charge-discharge circuit to a charging state when the output voltage Vmin becomes lower than the minimum threshold voltage Vmin. When the edge signal SE becomes the predetermined level, the charge-discharge control unit switches the charging state and the discharging state of the charge-discharge circuit.

8 Claims, 12 Drawing Sheets

U.S. PATENT DOCUMENTS 7,557,622 B2 * 7/2009 Stanley ............ 327/131

FOREIGN PATENT DOCUMENTS

| JP | 3-256405 | 11/1991 |
|---|---|---|
| JP | 2000-91909 | 3/2000 |
| JP | 2001-345682 | 12/2001 |
| JP | 2004-72657 | 3/2004 |

OTHER PUBLICATIONS

International Search Report for International Patent Application No. PCT/JP2006/322772 mailed Dec. 12, 2006 with English Translation.

Office Action for Chinese Application No. 200680002319.1 issued Jun. 12, 2009 with English translation.

* cited by examiner

38

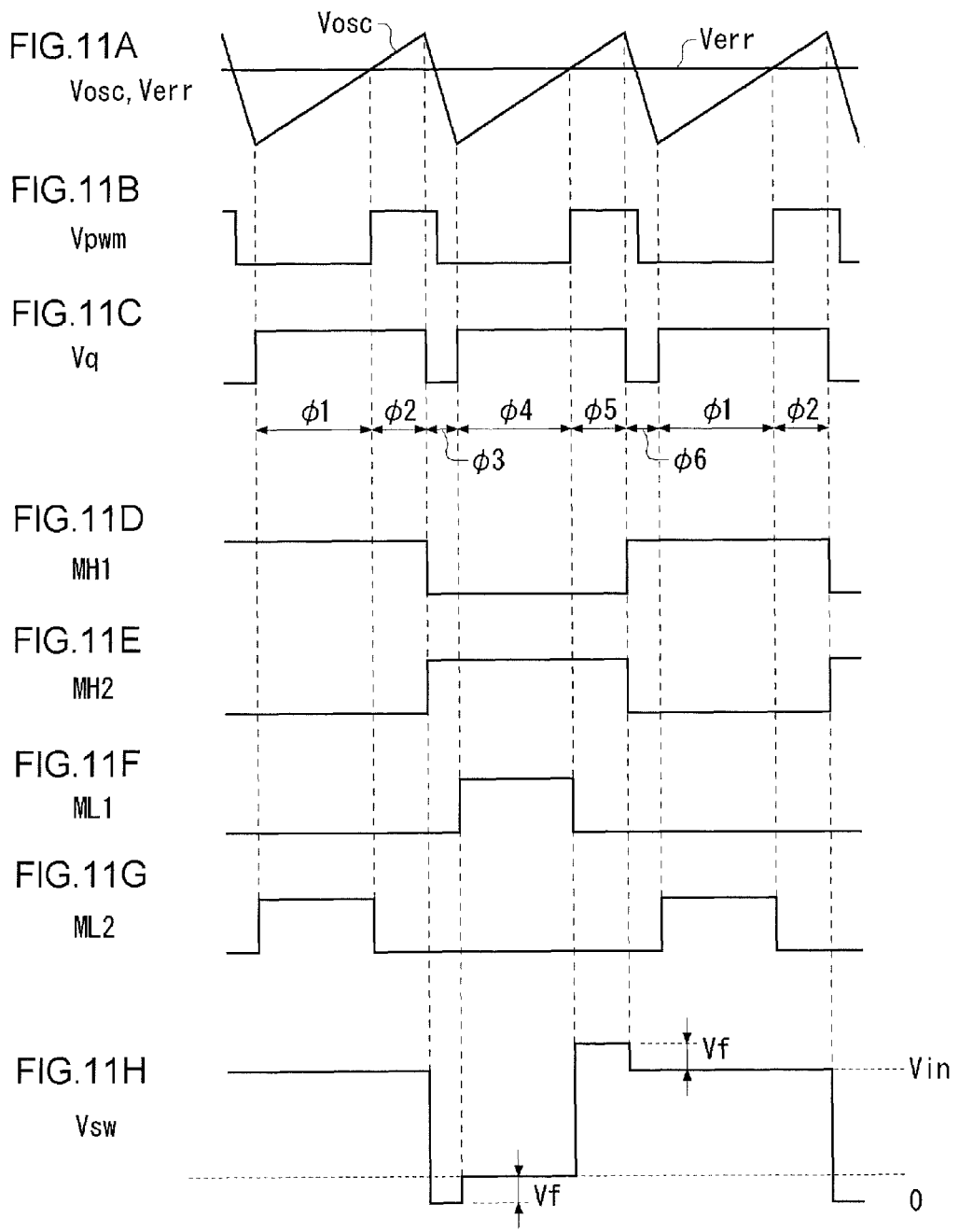

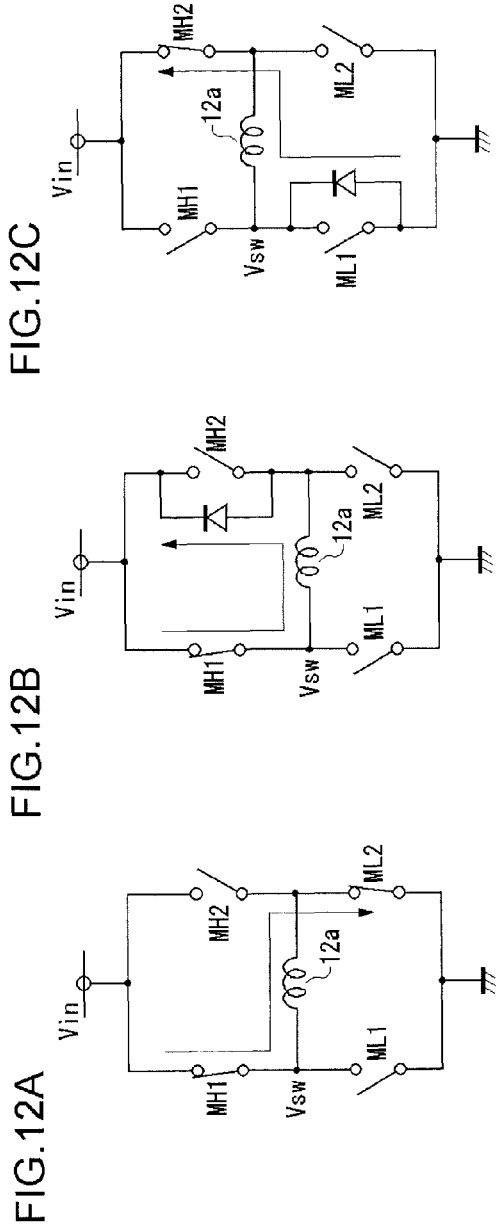

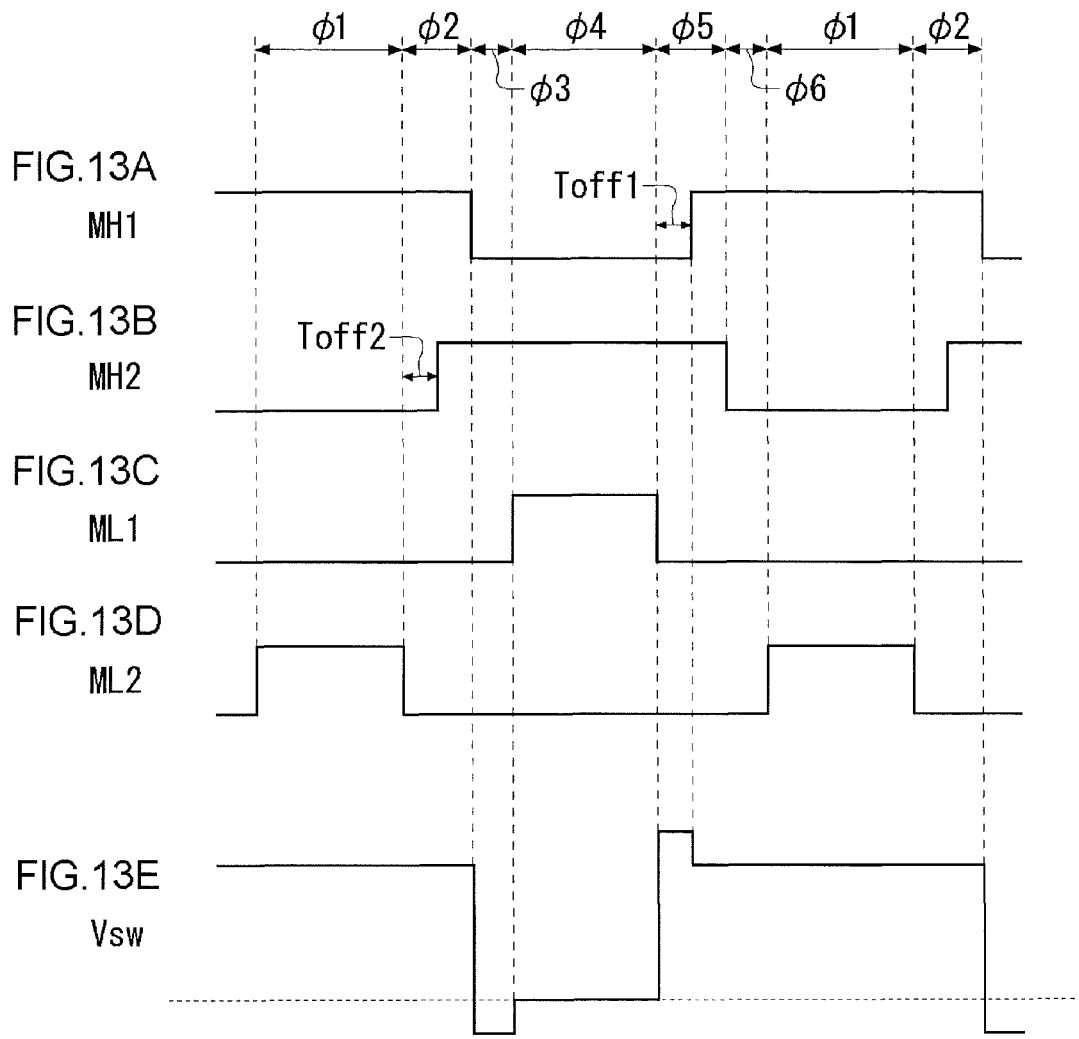

TRIANGULAR-WAVE GENERATING CIRCUIT, AND INVERTER, LIGHT EMITTING DEVICE AND LIQUID CRYSTAL TELEVISION USING THE CIRCUIT

CROSS REFERENCE TO RELATED APPLICATIONS

This is a U.S. national stage of application No. PCT/JP2006/322772, filed on 15 Nov. 2006 Priority under 35 U.S.C. §119(a) and 35 U.S.C. §365(b) is claimed from Japanese Application No. 2005-332203, filed 16 Nov. 2005 the disclosure of which is also incorporated herein by reference.

BACKGROUND OF THE INVENTION

1. Field of the Invention

The present invention relates to a triangular wave generation circuit and it particularly relates to a triangular wave generation circuit which can be synchronized with an external circuitry.

2. Description of the Related Art

Pulse-width modulation techniques are widely used for inverters for converting DC voltage to AC voltage, power supply units such as a DC/DC converter for converting DC voltage to DC voltage, motor driver circuits for driving motors and the like. A pulse-width modulation is performed in a manner that error between a voltage to be controlled and a target voltage is amplified by an error amplifier and then the error voltage resulting therefrom is compared by a comparator with a periodic voltage with a triangular waveform having a certain frequency.

To generate periodic voltages of triangular waveforms used in such applications as mentioned above, analog triangular wave generation circuits as described in Patent Document 1 and Patent Document 2 are used widely. The triangular wave generation circuit charges and discharges a capacitor and alternates the charging and the discharging by comparing with two threshold values so as to generate a desired triangular wave signal.

[Patent Document 1] Japanese Patent Application Laid-Open No. 2004-72657.
[Patent Document 2] Japanese Patent Application Laid-Open No. 2001-345682.

There are cases where it is desired that triangular wave signals synchronized with each other are generated in two different semiconductor integrated circuits (hereinafter referred to as "IC" also). For instance, consider a case where two inverters are provided at both ends of a fluorescent lamp used as backlight of an LCD television and then supply drive voltages of mutually reversed phases are applied.

In the two inverters, when a phase lag occurs in triangular wave signals used in the DC/AC conversion, the phases of voltage applied to the both ends of the fluorescent lamp are not mutually reversed, thus causing an adverse effect on its emitting state. There are other occasions where the generation of triangular wave signals synchronized with an external signal is desired.

SUMMARY OF THE INVENTION

The present invention has been made in view of the problems described as above, and a general purpose thereof is to provide a triangular wave generation circuit capable of generating triangular wave signals synchronous with an external circuitry.

In order to resolve the above problems, a triangular wave generation circuit according to one embodiment of the present invention comprises: a capacitor whose potential is fixed at one end thereof; a charge-discharge circuit which charges or discharge the capacitor; a first comparator which compares an output voltage appearing at the other end of the capacitor with a predetermined maximum threshold voltage and which outputs a first comparison signal in response to a comparison result; a second comparator which compares the output voltage with a predetermined minimum threshold voltage that is lower than the maximum threshold value and which outputs a second comparison signal in response to a comparison result; an edge detection circuit which detects an edge of a synchronization signal, inputted externally, having approximately ½ of frequency of a triangular wave signal generated by the triangular wave generation circuit and which outputs an edge detection signal that becomes a predetermined level for each edge; and a charge-discharge control unit which refers to the first and the second comparison signal outputted from the first and the second comparator, respectively, and which sets the charge-discharge circuit to a discharging state when the output voltage becomes higher than the maximum threshold voltage and which sets the charge-discharge circuit to a charging state when the output voltage becomes lower than the minimum threshold voltage. When the edge detection signal outputted from the edge detection circuit becomes the predetermined level, the charge-discharge control unit switches the charging and the discharge state of the charge-discharge circuit.

According to this embodiment, the charging and discharging are repeated, by the first and the second comparator, between the maximum threshold voltage and the minimum threshold voltage. And when an edge of the synchronization signal is detected, the charging and the discharging state of the charge-discharge circuit are switched forcibly. As a result, a bottom edge or peak edge of the output voltage can be aligned with an edge of the synchronization signal so as to synchronize the phase.

The charge-discharge control circuit may include: a logic synthesis unit which outputs a logical sum (OR) of the first comparison signal outputted from the first comparator and the edge detection signal; and a flip-flop which is set or reset according an output signal of the logic synthesis unit and the second comparison signal.

In this patent specification, the "flip-flop" includes a D latch, an RS latch and the like, besides an RS flip-flop and the like, and represents an element where an output signal can be switched by a high level and a low level.

In this case, the state is switched to a discharging state by either the first comparison signal or the edge detection signal whichever first changes the level. Thereby, the peak edge of the output voltage can be aligned with the edge of the synchronization signal.

The charge-discharge control unit may include: a logic synthesis unit which outputs a logical sum of the second comparison signal outputted from the second comparator and the edge detection signal; and a flip-flop which is set or reset according to an output signal of the logic synthesis unit and the first comparison signal.

In this case, the state is switched to a charging state by either the second comparison signal or the edge detection signal whichever first changes the level. Thereby, the bottom edge of the output voltage can be aligned with the edge of the synchronization signal.

The charge-discharge control unit may include: a first current source which delivers current to the capacitor; and a second current source which pulls current from the capacitor, and the charge-discharge control unit may control on and off of the first current source and the second current source by an output signal of the flip-flop.

A triangular wave generation circuit according to one embodiment may further comprise a divider which divides an output signal of the flip-flop by two, wherein an output signal of the divider may be outputted outside the triangular wave generation circuit as the synchronization signal. In such a case, the synchronization signals can be produced by the triangular wave generation circuit itself.

Another embodiment of the present invention relates to an inverter. This inverter comprises: a transformer; a first high-side transistor one end of which connects to an input terminal where an input voltage is applied and the other end of which connects to a first terminal of a primary coil of the transformer; a first low-side transistor one end of which connects to a potential-fixed terminal where potential is fixed and the other end of which connects to the first terminal of the first terminal thereof; a second high-side transistor one end of which connects to the input terminal thereof and the other end of which connects to a second terminal of the primary coil thereof; a second low-side transistor one end of which connects to the potential-fixed terminal and the other end of which connects to the second terminal of the primary coil; a current-voltage conversion unit which converts current at the secondary coil of the transformer into voltage so as to be outputted as a detection voltage; an above-described triangular wave generation circuit which generates the triangular wave signal; an error amplifier which outputs an error voltage corresponding to error between the detection voltage and a predetermined reference voltage; and a logic control unit which controls on and off of the first and the second high-side transistor and the first and the second low-side transistor, based on the error voltage and the triangular wave signal generated by the triangular wave generation circuit According to this embodiment, the phase of an AC signal outputted from the inverter can be adjusted in a manner that the signal is synchronized with the synchronization signal inputted from outside.

The logic control circuit may turn on the first high-side transistor and the second low-side transistor in a first period during which the triangular wave signal starts from a bottom edge thereof until it reaches an error voltage. Then the logic control circuit may turn on the first high-side transistor in a second period until the triangular wave signal reaches a peak edge. Then it may turn on the second high-side transistor in a third period until the triangular wave signal reaches a bottom edge. Then it may turn on the first low-side transistor and the second high-side transistor in a fourth period until the triangular wave signal reaches again the error voltage. Then it may turn on the second high-side transistor in a fifth period until the triangular wave signal reaches again a peak edge. Then it may turn on the first high-side transistor in a sixth period until the triangular wave signal reaches again a bottom edge. The logic control unit may control the on and off of the first and the second high-side transistor and the first and the second low-side transistor by inverting the peak edge and the bottom edge.

Still another embodiment of the present invention relates to a light emitting apparatus. This light emitting apparatus comprises: a fluorescent lamp; and two of the above-described inverters, provided at both ends of the fluorescent lamp, which supply drive voltages having mutually reversed phases to the fluorescent lamp.

According to this embodiment, the synchronization signal is transmitted and received between the two inverters, so that operations of an triangular wave generation circuit provided therein can be synchronized and the drive voltages having mutually revered phases can be suitably generated. As a result, the fluorescent lamp can emit light uniformly.

Still another embodiment of the present invention relates to a liquid-crystal television. This liquid-crystal television comprises: a liquid-crystal panel; and a plurality of the above-described light emitting apparatuss arranged on a backside of the liquid-crystal panel.

According to this embodiment, the brightness variation or nonuniformity in the light emitting apparatuss used as backlight can be suppressed.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 11A to 11H are timing charts showing operating states of an inverter shown in FIG. 8;

FIGS. 12A to 12F are circuit diagrams showing the flow of electric current in an H-bridge circuit in an inverter of FIG. 8; and FIG. 13 is a timing chart showing an operating state of an inverter according to a modification.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
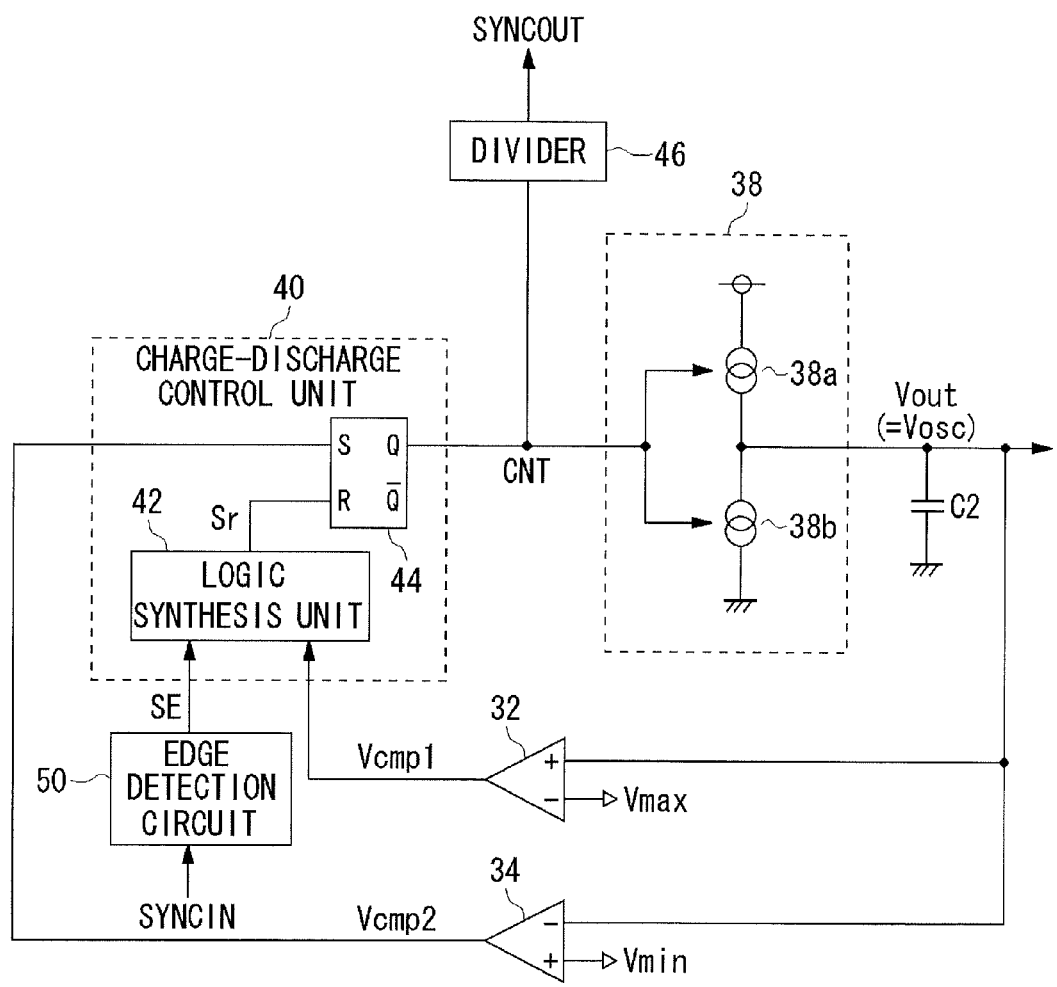
FIG. 1 is a circuit diagram showing a triangular wave generation circuit according to an embodiment.
Figure 2:
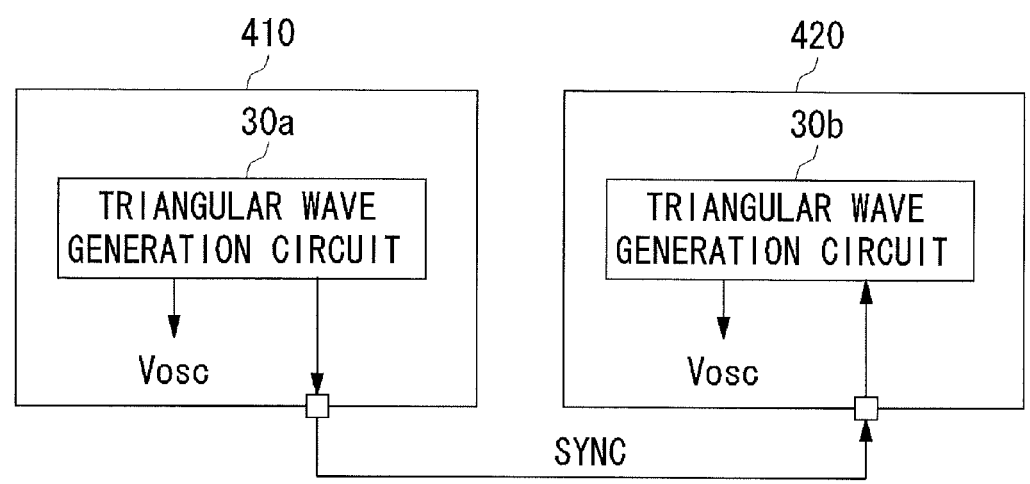
FIG. 2 is a block diagram showing a structure of a system where a triangular wave generation circuit of FIG. 1 is used.

FIG. 1 is a circuit diagram showing a triangular wave generation circuit 30 according to an embodiment. FIG. 2 is a block diagram showing a structure of a system where the triangular wave generation circuit 30 of FIG. 1 is used. An outline of an operation of the triangular wave generation circuit 30 according to the present embodiment will be first described with reference to FIG. 2.

A system 400 includes a first circuit 410 and a second circuit 420. The first circuit 410 and the second circuit 420 may each have the same functions or may have functions different from each other. The first circuit 410 and the second circuit 420 each includes the triangular wave generation circuit 30 according to the present embodiment. One of a triangular wave generation circuit 30a in the first circuit 410 and a triangular wave generation circuit 30b in the second circuit 420 operate as a master circuit, whereas the other thereof operates as a slave circuit. In the present embodiment, a description will be given of a case where the triangular wave generation circuit 30a in the first circuit 410 operates as a master side and the triangular wave generation circuit 30b in the second circuit 420 operates as a slave side.

The triangular wave generation circuit 30a in the master side generates a triangular wave signal Vosc having a predetermined frequency f. Also, the triangular wave generation circuit 30a outputs a synchronization signal SYNC, whose frequency is f/2, to the triangular generation circuit 30b in the slave side. Based on the synchronization signal SYNC, the triangular wave generation circuit 30b generates the phase-synchronized triangular wave signal Vosc which has the same frequency f as that of the triangular wave generation circuit 30a.

Referring back to FIG. 1, a structure of the triangular wave generation circuits 30a and 30b. In the following description, the distinction is not particularly made between the triangular wave generation circuit 30a in the master side and the triangular wave generation circuit 30b in the salve side, and they will be generically referred to as "triangular wave generation circuit 30" simply.

The triangular generation circuit 30 includes a capacitor C2, a charge-discharge circuit 38, a first comparator 32, a second comparator 34, an edge detection circuit 50, and a charge-discharge control unit 40. As described above, the triangular wave generation circuit 30 generates the triangular wave signal Vosc in synchronization with a synchronization signal SYNCIN inputted from outside. As described above, the frequency of the synchronization signal SYNCIN is approximately double the frequency of the triangular wave signal Vosc.

One end of the capacitor C2 is grounded and the potential thereof is fixed. The charge-discharge circuit 38 includes a first current source 38 which delivers current to the capacitor C2 and a second current source 38b which pulls current from the capacitor C2. The charge-discharge circuit 38 charges or discharges the capacitor C2 by controlling the on and off of the first current source 38a and the second current source 38b. The switching of a charging and a discharging state of the charge-discharge circuit 38 is controlled by a control signal CNT. In the present embodiment, when the control signal CNT is in a high level, the charge-discharge circuit 38 sets it to the charging state, whereas when a low level, the charge-discharge circuit 38 sets it to the discharging stage.

A voltage appearing at the capacitor C2 is an output voltage Vout of the triangular wave generation circuit 30 and is outputted as the triangular wave signal Vosc.

The first comparator 32 compares the output voltage Vout appearing at the other end of the capacitor C2 with a predetermined maximum threshold voltage Vmax, and outputs a first comparison signal Vcmp1 corresponding to the comparison result. In the present embodiment, the first comparison signal Vcmp1 goes to a high level when Vout>Vmin, whereas it goes to a low level when Vout<Vmin. The second comparator 34 compares the output voltage Vout with a predetermined minimum threshold voltage Vmin which is lower than the maximum threshold voltage, and outputs a second comparison signal Vcmp2 corresponding to the comparison result. The second comparison signal Vcmp2 goes to a high level when Vout<Vmin, whereas it goes to a low level when Vout>Vmin. The first comparison signal Vcmp1 and the second comparison signal Vcmp2 are outputted to the charge-discharge control unit 40.

The periodic signal SYNCIN having approximately ½ of the frequency of the triangular wave signal Vosc is inputted to the edge detection circuit 50. The edge detection circuit 50 detects an edge of the synchronization signal SYNCIN and outputs an edge detection signal SE which goes to a high level for every edge.

Figure 3:
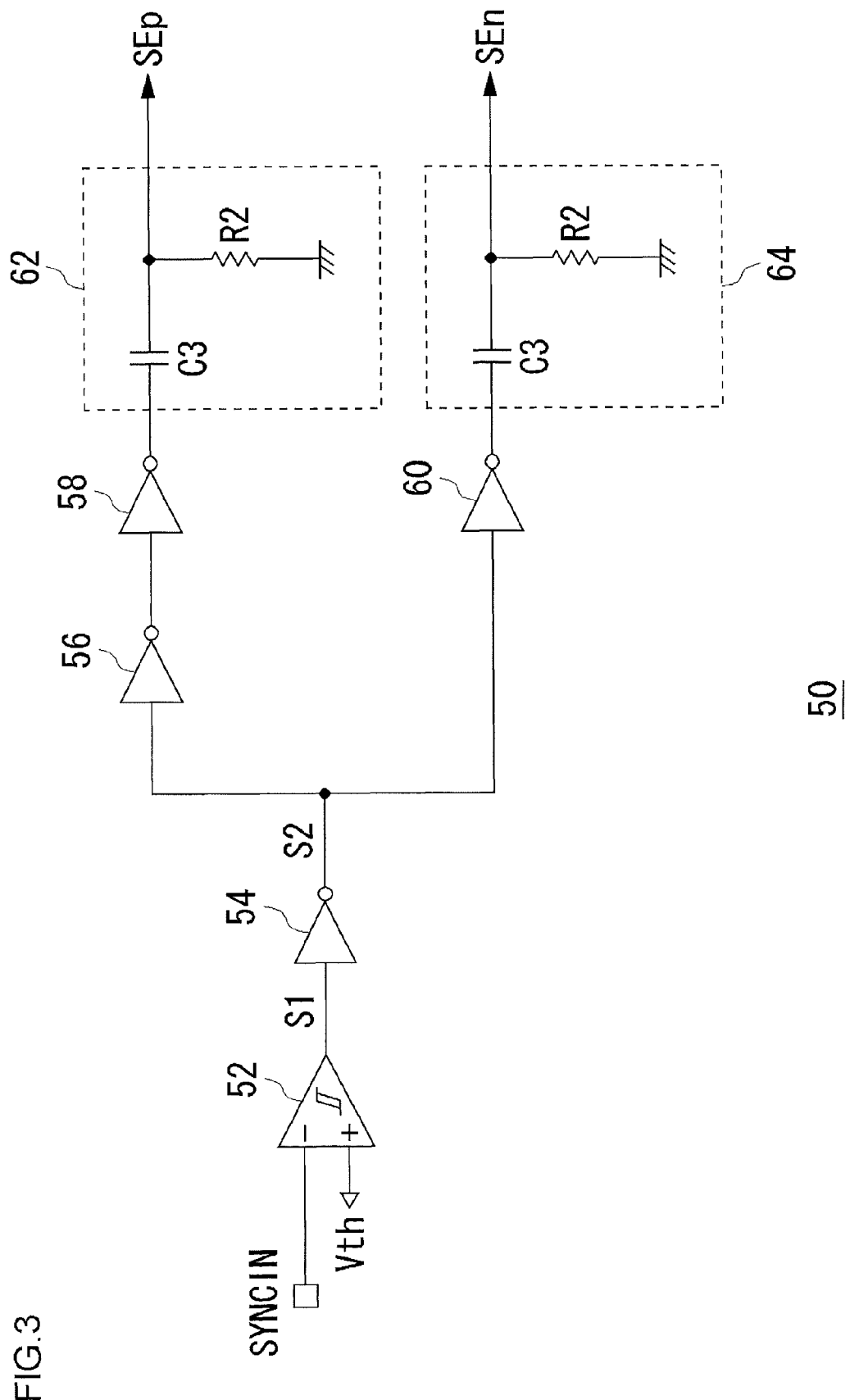
FIG. 3 is a circuit diagram showing an exemplary structure of an edge detection circuit.

FIG. 3 is a circuit diagram showing an exemplary structure of the edge detection circuit 50. The edge detection circuit 50 includes a hysteresis comparator 52, inverters 54, 56, 58 and 60 and differentiators 62 and 64.

The synchronization signal SYNCIN is inputted to an inverting input terminal of the hysteresis comparator 52. A threshold voltage is inputted to a noninverting input terminal of the hysteresis comparator 52. The noise components of the synchronization signal SYNCIN are removed by the hysteresis comparator 52, and the logical value is inverted and outputted. An output signal S1 of the hysteresis comparator 52 is inputted to the inverter 54. The inverter 54 inverts the output signal S1 of the hysteresis comparator 52. An output signal S2 of the inverter 54 is outputted to the inverter 56 and the inverter 60.

The inverters 56 and 58 invert twice the output signal S2 of the inverter 54 and then outputs it to the differentiator 62. The differentiator 62 includes a capacitor C3 and a resistor R2 and outputs a voltage, where an output signal S3 of the inverter 58 has been differentiated, as a positive-edge detection signal SEp. The inverter 60 inverts once the output signal S2 of the inverter 54 and then outputs it to the differentiator 64. The differentiator 64 outputs a voltage, where an output signal S4 of the inverter 60 has been differentiated, as a negative-edge detection signal SEn. Two edge detection signals SE that go to a high level at a positive edge and a negative edge of the synchronization signal SYNCIN, respectively, are outputted from the edge detection circuit 50 configured as above.

Refer back to FIG. 1. The edge detection signal SE outputted from the edge detection circuit 50, together with the first comparison signal Vcmp1 outputted from the first comparator 32 and the second comparison signal Vcmp2 outputted from the second comparator 34, are inputted to the charge-discharge control unit 40.

The charge-discharge control unit 40 generates the control signal CNT by referring to the first comparison signal Vcmp1, the second comparison signal Vcmp2 and the edge detection signal SE so as to switch the charging and discharging state of the charge-discharge circuit 38. The charge-discharge control unit 40 includes a logic synthesis unit 42 and an RS flip-flop 44. The logic synthesis unit 42 outputs the logical sum of the first comparison signal Vcmp1 and the edge detection signal SE as a reset signal Sr.

The reset signal Sr outputted from the logic synthesis unit 42 is inputted to a reset terminal of the RS flip-flop 44. The second comparison signal Vcmp2 outputted from the second comparator 34 is inputted to a set terminal of the RS flip-flop 44. This RS flip-flop 44 is set and reset by a second comparison signal Vcmp2 and a reset signal Vr. The output signal of the RS flip-flop 44 is outputted to the charge-discharge circuit 38 as the control signal CNT.

Figure 4:
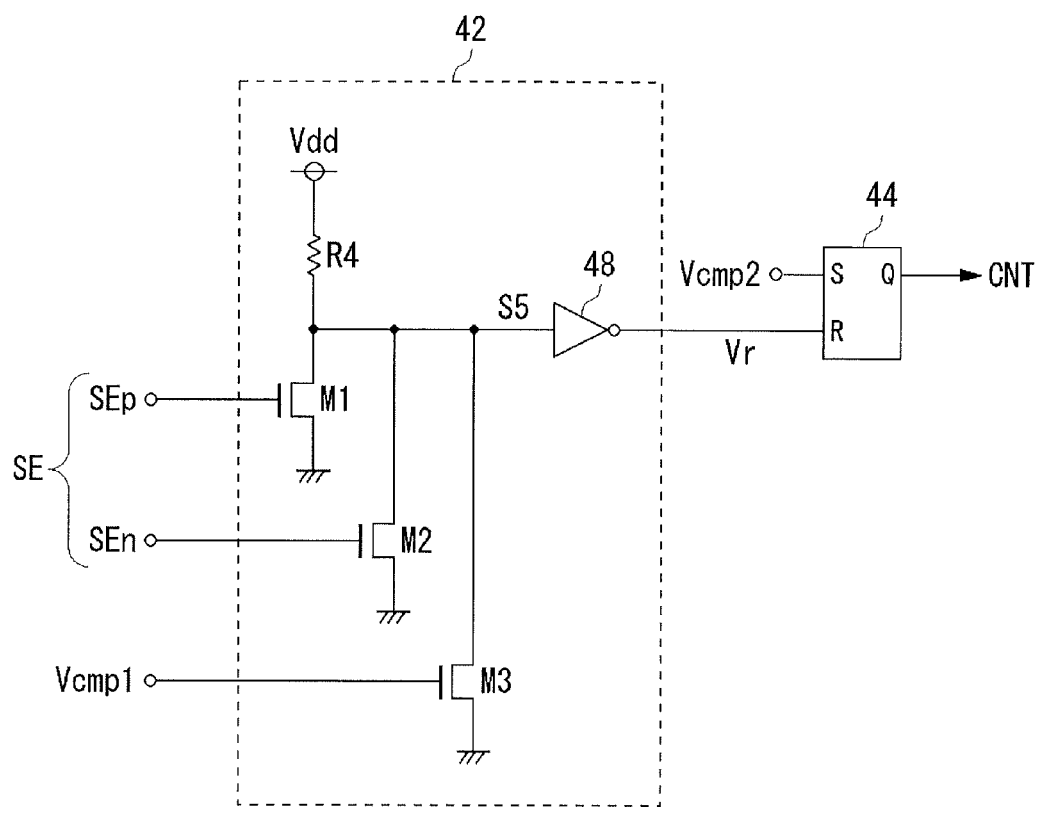
FIG. 4 is a circuit diagram showing an exemplary structure of a charge-discharge control unit.

FIG. 4 is a circuit diagram showing an exemplary structure of the charge-discharge control unit 40. The charge-discharge control unit 40 includes a resistor R4, a transistor M1, a transistor M2, a transistor M3, and an inverter 48. One end of the resistor R4 is connected to the power supply line. The transistors M1, M2 and M3 are provided in parallel with each other between the other end of the resistor R4 and ground. The positive-edge detection signal SEp, the negative-edge detection signal SEn and the first comparison signal Vcmp1 are inputted to gates of the transistors M1, M2 and M3. Potential at the connection point of the resistor R4 and the transistors M1 to M3 is inputted to the inverter 48. An output of the inverter 48 is outputted as a reset signal Vr.

When at least one of the transistors M1, M2 and M3 turns on, that is, when at least one of the edge detection signals SEp and SEn and first comparison signal Vcmp1 goes to a high level, the current flows through the resistor R4 and a voltage drop occurs and thereby an input signal S5 of the inverter 48 goes to a low level and the reset signal Vr goes to a high level. Conversely, when all of the transistors M1, M2 and M3 are off, the input signal S5 of the inverter 48 is pulled up to a high level, so that the reset signal Vr goes to a low level. In this manner, the logic synthesis unit 42 configured as above functions as an OR gate and outputs the logical sum of the edge detection signal SE and the first comparison signal Vcmp1 as the reset signal Vr.

As the output voltage Vout becomes higher than the maximum threshold voltage Vmax, that is, as the first comparison signal Vcmp1 goes to a high level, the charge-discharge control unit 40 set the control signal CNT to a high level and sets the charge-discharge circuit 38 to a discharging state. As the output voltage Vout becomes lower than the minimum threshold voltage Vmin, that is, as the second comparison signal Vcmp2 goes to a high level, the charge-discharge control unit 40 set the control signal CNT to a high level and sets the charge-discharge circuit 38 to a charging state.

As the edge detection signal SE goes to a high level, the charge-discharge control unit 40 switches the charging and discharging state of the charge-discharge circuit 38. In the present embodiment, when the edge detecting signal SE goes to a high level, the charge-discharge circuit 38 sets the control signal CNT to a low level and sets the charge-discharge circuit 38 to a discharging state.

Figure 5:
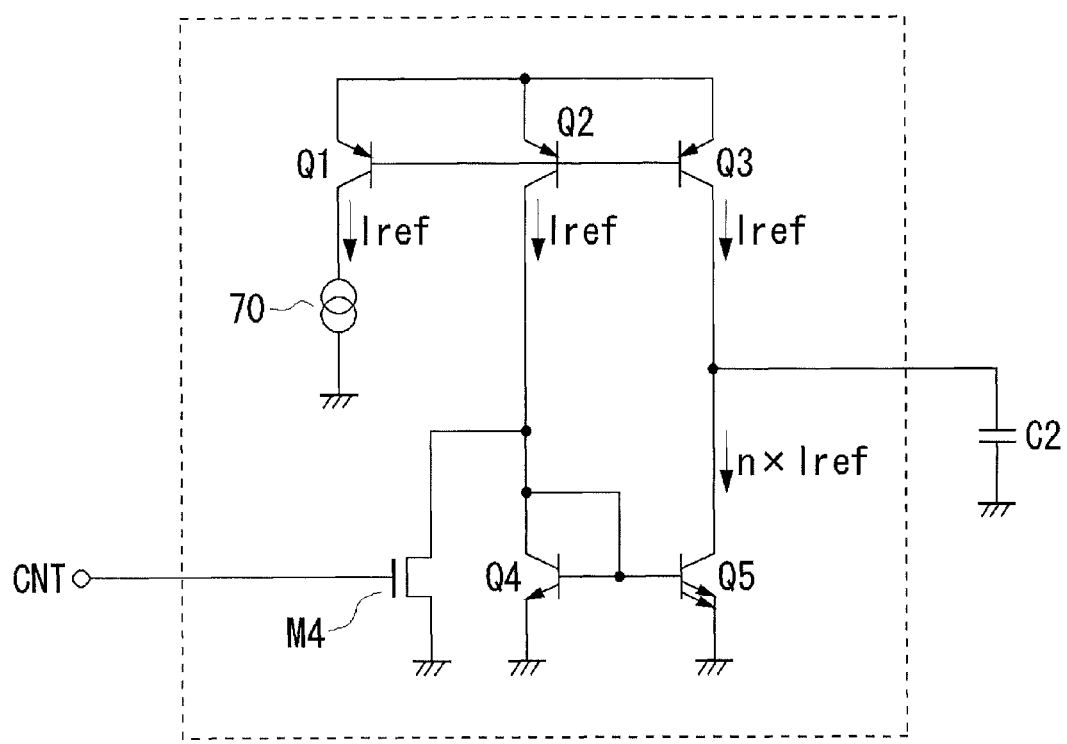
FIG. 5 is a circuit diagram showing an exemplary structure of a charge-discharge circuit.

FIG. 5 is a circuit diagram showing an exemplary structure of the charge-discharge circuit 38. The charge-discharge circuit 38 includes a constant-current source 70, bipolar transistors Q1 to Q5, and a MOS transistor M4. The constant-current source 70 generates a reference current Iref. The bipolar transistor Q1 is provided on a path of the reference current Iref generated by the constant-current source 70. Bases and emitters of the bipolar transistors Q2 and Q3 are connected in common with a base and an emitter of the bipolar transistor Q1, thus constituting a current-mirror circuit. The bipolar transistors Q4 and Q5 are provided on a current path of the bipolar transistors Q2 and Q3. Bases and emitters of the bipolar transistor Q4 and Q5 are connected in common with each other, thus constituting a current-mirror circuit. For example, the transistor sizes of bipolar transistors Q1 to Q4 are each set equal to one another, and the transistor size of the bipolar transistor Q5 is set to a factor of n.

The MOS transistor M4 is provided between the base of the bipolar transistor Q4 and ground, and the control signal CNT is inputted to a gate of the MOS transistor M4.

When the control signal CNT goes to a high level, the MOS transistor M4 turns on and the bipolar transistors Q4 and Q5 turn off. As a result, the reference current Iref flowing through the bipolar transistor Q3 is delivered to the capacitor C2, thus setting it to a charging state.

On the other hand, when the control signal CNT goes to a low level, the MOS transistor M4 turns off. And the reference current Iref flows through the bipolar transistor Q3, and the current which is n times the reference current Iref flows through the bipolar transistor Q5. As a result, the current (n−1)×Iref is pulled out of the capacitor C2, thus setting it to a discharging state.

Refer back to FIG. 1. The control signal CNT outputted from the charge-discharge control unit 40 is inputted to the charge-discharge circuit 38 and, at the same time, is inputted to the divider 46. The divider 46 divides the control signal by two and outputs it to outside the triangular wave generation circuit 30 as a synchronization signal SYNCOUT.

Figure 6:
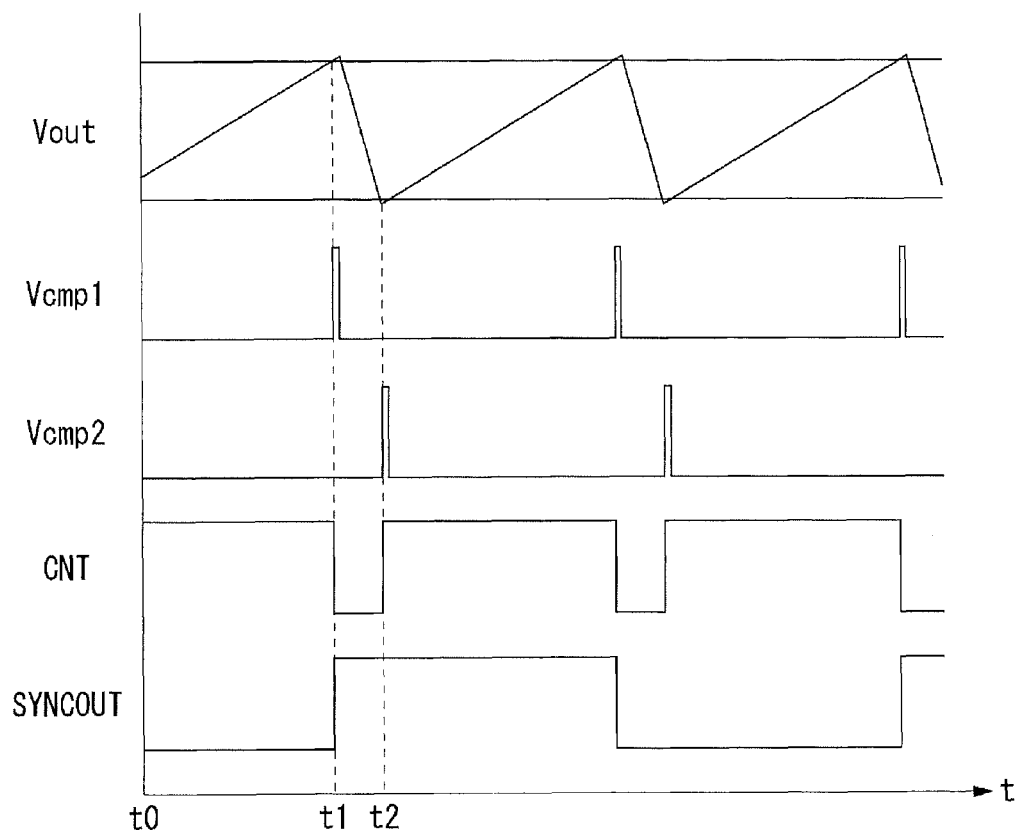
FIG. 6 is a timing chart showing an operating state of a master-side triangular wave generation circuit.
Figure 7:
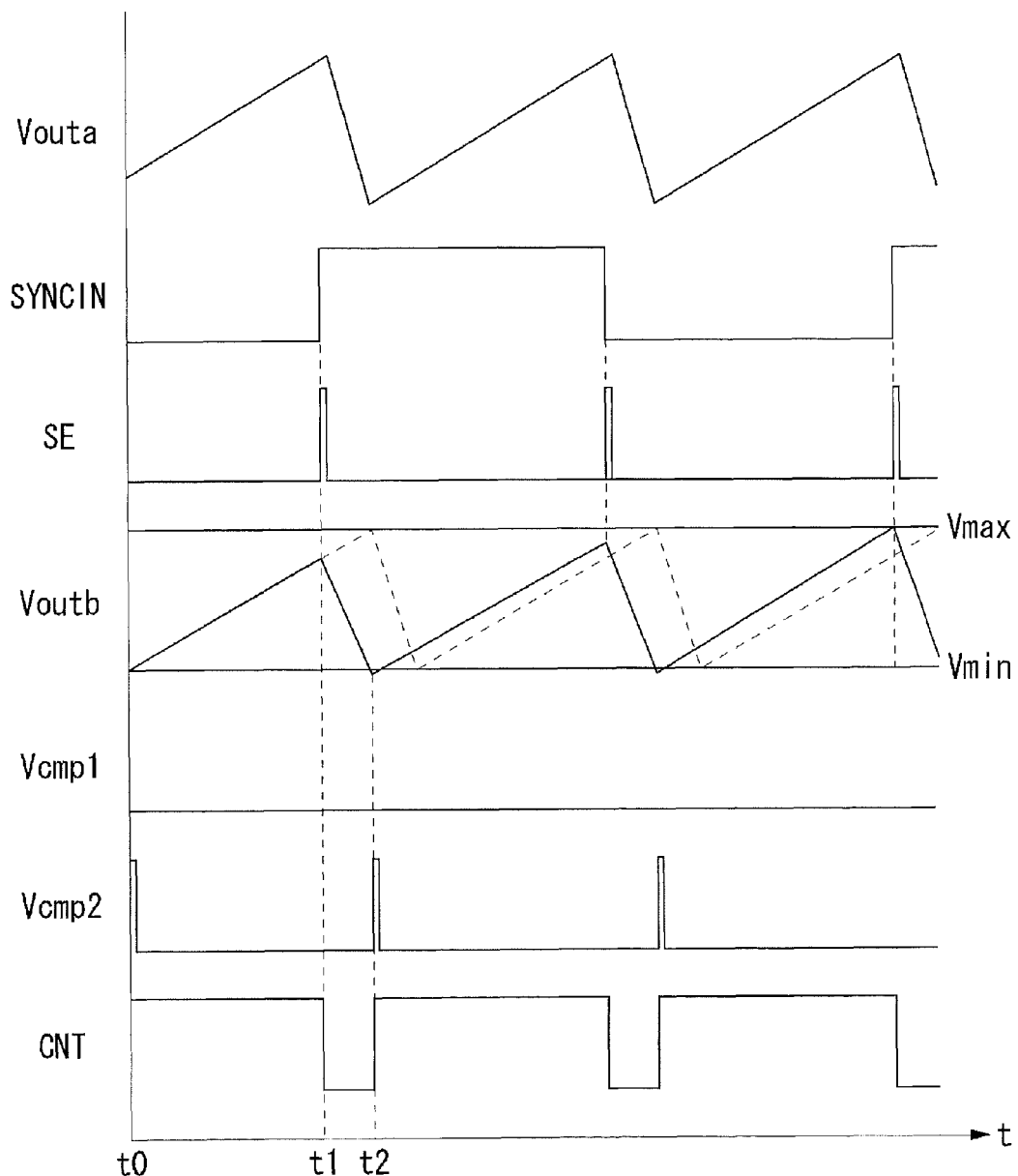
FIG. 7 is a timing chart showing an operating state of a slave-side triangular wave generation circuit.

An operation of the triangular wave generation circuit 30 configured as above will now be described with reference to FIG. 6 and FIG. 7. FIG. 6 is a timing chart showing an operating state of the master-side triangular wave generation circuit 30a. FIG. 7 is a timing chart showing an operating state of the slave-side triangular wave generation circuit 30b.

The operation of the master-side triangular wave generation circuit 30a is first described with reference to FIG. 6. The synchronization signal SYNCIN is not inputted to the master-side triangular wave generation circuit 30a and it is pulled down to a low level or pulled up to a high level.

At time t0, the control signal CNT is in a high level, and the charge-discharge circuit 38 is set to a charging state. When it is in the charging state, the capacitor C1 is charged up and the output voltage Vout rises with time. As the output voltage Vout reaches the maximum threshold voltage Vmax at time t1, the first comparison signal Vcmp1 goes to a high level and the RS flip-flop 44 is reset and thus the control signal CNT goes to a low level.

As the control signal CNT goes to a low level at time t1, the charge-discharge circuit 38 is set to a discharging state. When it is in the discharging state, the capacitor C1 is discharged and the output voltage Vout drops with time. As the output voltage Vou drops down to the maximum threshold voltage Vmin at time t2, the second comparison signal Vcmp goes to a high level and the RS flip-flop 44 is set and thus the control signal CNT goes to a high level. The master-side triangular wave generation circuit 30a generates a triangular wave signal in a manner that an operation indicated from time t0 till time t2 is one cycle. Then it outputs the synchronization signal SYNCOUT, where the control signal CNT is divided by half, to the slave-side triangular wave generation circuit 30b.

Next, the operation of the slave-side triangular wave generation circuit 30b is described with reference to FIG. 7. Shown in FIG. 7 from top to bottom are an output voltage Vouta of the master-side triangular wave generation circuit 30a, a synchronization signal SYNCIN which is outputted from the master-side triangular wave generation circuit 30a and inputted to the slave-side triangular wave generation circuit 30b, an edge detection signal SE, an output voltage Voutb of the slave-side triangular wave generation circuit 30b, a first comparison signal Vcmp1 and a second comparison signal Vcmp2 of the triangular wave generation circuit 30b, and a control signal CNT.

The edge detection circuit 50 detects an edge of the synchronization signal SYNCIN and outputs an edge detection signal SE which goes high for every edge.

At time t0, the control signal CNT is in a high level. Thus the charge-discharge circuit 38 in the triangular wave generation circuit 30b is in a charging state, and the output voltage Voutb rises with time. Then, at time t1 the edge detection signal SE goes to a high level before it reaches the maximum threshold voltage Vmax. As the edge detection signal SE goes to the high level, the RS flip-flop 44 is reset by the edge detection signal SE but not by the first comparison signal Vcmp1. And the control signal CNT goes to a low level and the charge-discharge circuit 38 is set to a discharging state.

Subsequently, as the output voltage Voutb becomes lower than the minimum threshold value Vmin at time t2, the second comparison signal Vcmp2 goes to a high level and the RS flip flop 44 is set and thus the control signal CNT goes to a high level. As a result, the charge-discharge circuit 38 is switched to a charging state and the output voltage Voutb starts rising again.

When a synchronization control is not performed, the output voltage Voutb of the triangular wave generation circuit 30b is generated regardless of the output voltage Vouta of the triangular generation circuit 30a. Thus, as shown in dotted lines, it becomes a signal with a phase lagged. On the other hand, in the triangular wave generation circuit 30 according to the present embodiment, the charge-discharge circuit 38 is set to a charging state by the second comparison signal Vcmp2. Also, the charge-discharge circuit 38 is set to a discharging state by either the first comparison signal Vcmp1 or the edge detection signal SE whichever first goes to a high level.

As a result, the peak edge of the output voltage Voutb is adjusted so that the peak edge thereof occurs simultaneously with an edge of the synchronization signal SYNCIN. Thus the frequencies and phases of the two triangular wave generation circuits 30a and 30b are synchronized.

Figure 8:
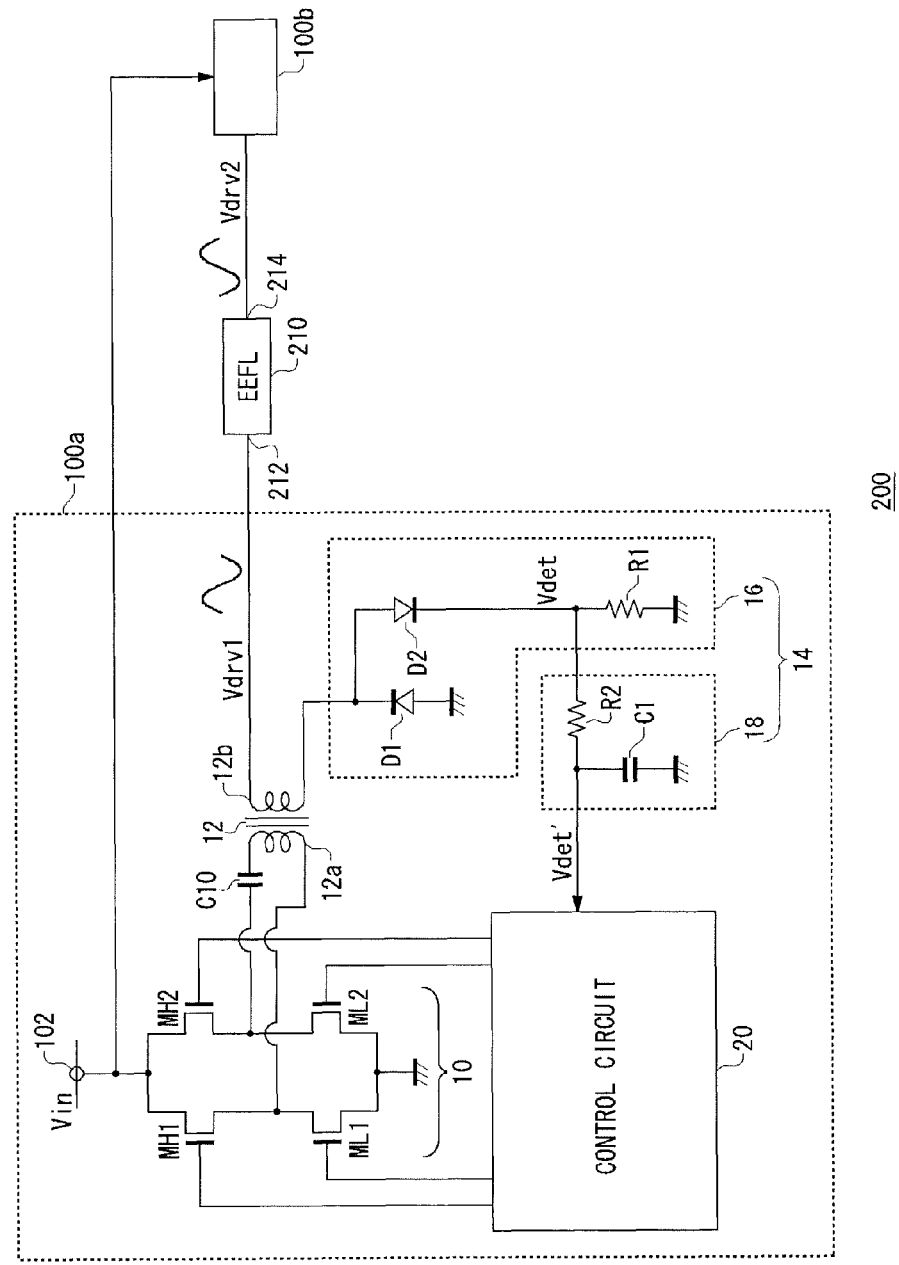
FIG. 8 is a circuit diagram showing a structure of a light emitting apparatus according to an embodiment.
Figure 9:
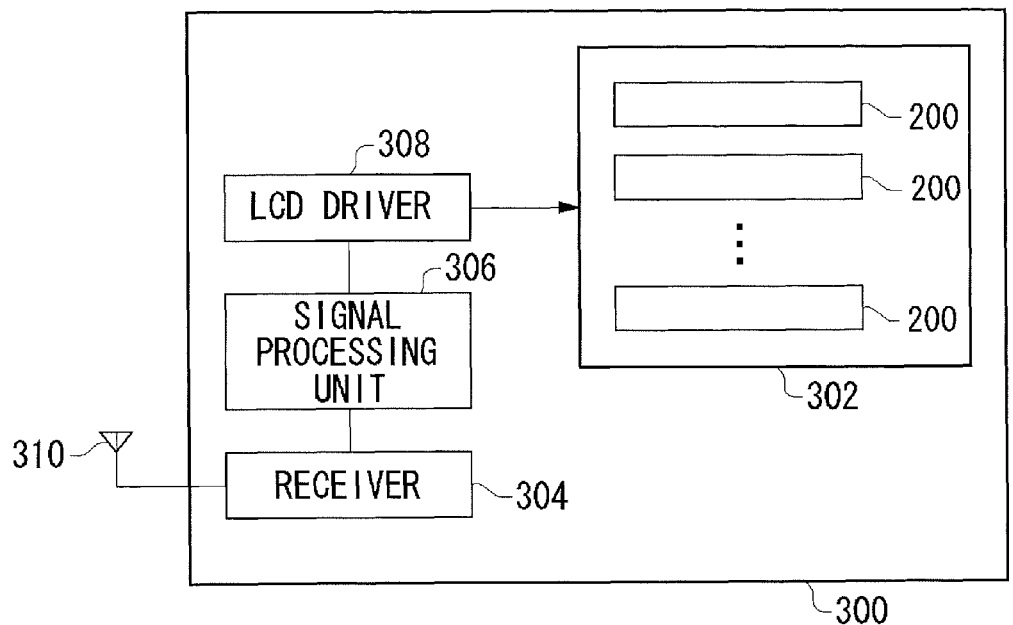
FIG. 9 is a block diagram showing a structure of an LCD television on which an light emitting apparatus of FIG. 8 is mounted.

Next, a description is given of applications of the triangular wave generation circuit 30 configured as above. FIG. 8 is a circuit diagram showing a structure of a light emitting apparatus 200 according to an embodiment. FIG. 9 is a block diagram showing a structure of an LCD television 300 on which the light emitting apparatus 200 of FIG. 8 is mounted. The LCD television 300 is connected with an antenna 310. The antenna 310 receives broadcast waves and outputs received signals to a receiver 304. The receiver 304 detects and amplifies the received signal so as to be outputted to a signal processing unit 306. The signal processing unit 306 outputs image data, acquired by demodulating the modulated data, to an LCD driver 308. The LCD driver 308 outputs the image data to an LCD panel 302 for each scanning line so as to display videos and images. On the backside of the LCD panel 302, a plurality of light emitting apparatuss 200 are arranged as backlight. The light emitting apparatuss 200 according to the present embodiment can be suitably used as the backlight for such an LCD panel 302. Hereinbelow, referring back to FIG. 8, a detailed description will be given of a structure and an operation of the light emitting apparatus 200.

The light emitting apparatus 200 according to the present embodiment includes an EEFL 210, a first inverter 100a, and a second inverter 100b. The EEFL 210 is placed on the back surface of the LCD panel 302. The first inverter 100a and the second inverter 100b, which are each a DC/AC converter, convert an input voltage Vin outputted from a DC power supply into AC voltage and boost it so as to supply a first drive voltage Vdrv1 and a second drive voltage Vdrv2 to a first terminal 212 and a second terminal 214 of the EEFL 210, respectively. The first drive voltage Vdrv1 and the second drive voltage Vdrv2 are AC voltages having mutually reversed phases.

Though there is provided a single EEFL 210 in FIG. 8, a plurality of EEFLs may be arranged in parallel with one another. A description is given hereunder of a structure of the first inverter 100a and the second inverter 100b according to the present embodiment. The first inverter 100a and the second inverter 100b have a similar structure to each other. Thus no distinction will be made therebetween and they will be generically referred to as "inverter 100" in the following description. A control circuit 20 in the first inverter 100a and a control circuit in the second inverter 100b correspond respectively to the first circuit 410 and the second circuit 420 in the system of FIG. 2.

The inverter 100 includes an H-bridge circuit 10, a transformer 12, a current-voltage conversion unit 14, a control circuit 20, and a capacitor C10.

The H-bridge circuit 10 includes four power transistors which are a first high-side transistor MH1, a first low-side transistor ML1, a second high-side transistor MH2 and a second low-side transistor ML2.

One end of the first high-side transistor MH1 is connected to an input terminal 102 to which an input voltage is applied, whereas the other end thereof is connected to a first terminal of a primary coil 12a of the transformer 12. One end of the first low-side transistor ML1 is connected to a ground terminal where the potential thereof is fixed, whereas the other end thereof is connected to the first terminal of the primary coil 12a. One end of the second high-side transistor MH2 is connected to the input terminal 102, whereas the other end thereof is connected to a second terminal of the primary coil via the DC-blocking capacitor C10. One end of the second low-side transistor ML2 is connected to the ground terminal, whereas the other end thereof is connected to the second terminal of the primary coil 12a via the DC blocking capacitor C10.

The current-voltage conversion unit 14 is provided between a secondary coil 12b of the transformer 12 and ground. The current-voltage conversion unit 14 converts the current flowing through the secondary coil 12b, namely the current flowing through the EEFL 210, into a voltage so as to output it as a detection voltage Vdet'. The current-voltage conversion unit 14 includes a rectifier circuit 16 and a filter 18.

The rectifier circuit 16 includes a first diode D1, a second diode D2, and a resistor R1. An anode of the first diode D1 is grounded, whereas a cathode thereof is connected to one end of the secondary coil 12b. An anode of the second diode D2 is connected with the cathode of the first diode D1. The resistor R1 is provided between a cathode of the second diode D2 and ground. The AC current flowing through the secondary coil 12b is half-wave rectified by the first diode D1 and the second diode D2 so as to flow through the resistor R1. A voltage drop which is proportional to the current flowing through the secondary coil 12b occurs across the resistor R1. The rectifier circuit 16 outputs the voltage drop across the resistor R1 as a detection voltage Vdet.

The filter 18 is a low-pass filter that includes a resistor R2 and a capacitor C1. The filter 18 feeds back the detection voltage Vdet', where high-frequency components have been removed, to the control circuit 20.

Based on the fed-back detection voltage Vdet', the control circuit 20 controls the on and off of the first high-side transistor MH1, the first low-side transistor ML1, the second high-side transistor MH2 and the second low-side transistor ML2 in the H-bridge circuit 10. A switching voltage is supplied to the primary coil 12a of the transformer 12 by controlling the H-bridge circuit 10. As a result, energy is converted in the transformer 12 so as to supply the first drive voltage Vdrv1 to the EEFL 210 connected with the secondary coil 12b.

Figure 10:
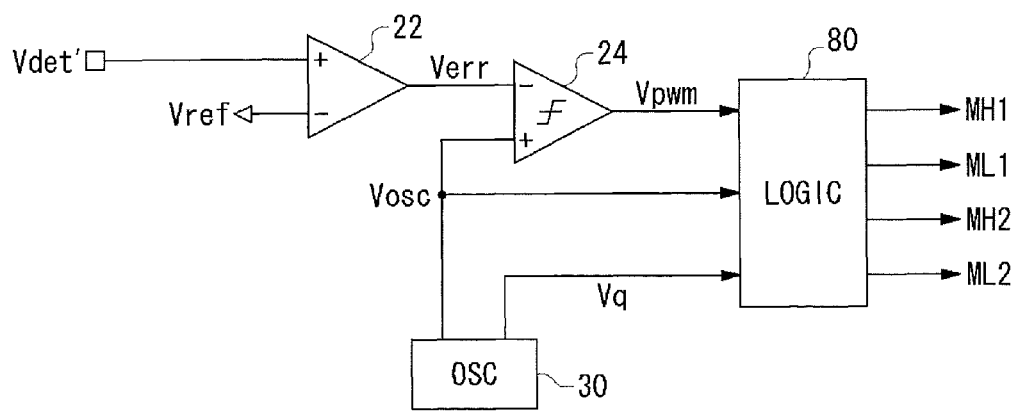
FIG. 10 is a circuit diagram showing a structure of a control circuit according to an embodiment.

A structure of the control circuit 20 is described as follows. FIG. 10 is a circuit diagram showing a structure of the control circuit 20 according to the present embodiment. The control circuit 20, which includes an error amplifier 22, a PWM comparator 24, a triangular wave generation circuit 30 and a logic control unit 80, is a function IC integrated on a single semiconductor substrate.

The detection voltage Vdet' which has been fed back from the current-voltage converter 14 is inputted to a noninverting input terminal of the error amplifier 22, whereas a predetermined reference voltage Vref is inputted to an inverting input terminal thereof. The reference voltage Vref is determined according to the light emission luminance of the EEFL 210. The error amplifier 22 outputs an error voltage Verr according to error between the detection voltage Vdet' and the reference voltage Vref.

The triangular wave generation circuit 30, which is the triangular wave generation circuit 30 shown in FIG. 1, generates a triangular wave signal Vosc of a triangular wave shape having a predetermined frequency.

The PWM comparator 24 compares the error voltage Verr outputted from the error amplifier 22 with the triangular wave signal Vosc outputted from the triangular wave generation circuit 30. When Verr<Vosc, the PWM comparator 24 generates a high-level pulse-width modulation signal (hereinafter referred to as "PWM signal") Vpwm. When Verr>Vosc, it generates a low-level PWM signal Vpwm. This PWM signal Vpwm together with the triangular wave signal Vosc and a periodic signal Vq is inputted to the logic control unit 80.

Based on the PWM signal Vpwm, the triangular wave signal Vosc and the periodic signal Vq, the logic control unit 80 controls the on and off of the first high-side transistor MH1, the first low-side transistor ML1, the second high-side transistor MH2 and the second low-side transistor ML2. A description will be given hereunder of the logic control unit 80.

The logic control unit 80 controls the H-bridge circuit 10 in a manner that two cycles of the triangular wave signal Vosc are taken as one cycle. More specifically, the switching control is performed in a manner that two cycles of the triangular wave signal Vosc are divided into six periods composed of a first period to a sixth period. FIGS. 11A to 11H are timing charts showing operating states of the inverter 100. FIG. 11A shows an error voltage Verr and a triangular wave signal Vosc. FIG. 11B shows a PWM signal Vpwm. FIG. 11C shows a periodic signal Vq. FIGS. 11D to 11G show states of the first high-side transistor MH1, the second high-side transistor MH2, the first low-side transistor ML1 and the second low-side transistor ML2, respectively. FIG. 11H shows a potential Vsw at the first terminal of the primary coil 12a of the transformer 12. In FIGS. 11D to 11G, a high level indicates that a transistor is on, and a low level indicates that it is off. The vertical axis and the horizontal axis of the same Figures are enlarged or reduced as appropriate for the simplicity of explanation.

A description is first given of dividing into six periods composed of a first period φ1 to a six period φ6. In the logic synthesis unit 42, a period during which the triangular wave signal Vosc starts from a bottom edge thereof until it reaches the error voltage Verr is denoted by the first period φ1. Then a period until the triangular wave signal Vosc reaches a peak edge is denoted by the second period φ2. Then a period until the triangular wave signal Vosc reaches a bottom edge is denoted by the third period φ3. Then a period until the triangular wave signal Vosc reaches again the error voltage Verr is denoted by the fourth period φ4. Then a period until the triangular wave signal Vosc reaches again a peak edge is denoted by the fifth period φ5. Then a period until the triangular wave signal Vosc reaches again a bottom edge is denoted by the sixth period φ6. This division can be constructed, by use of a commonly used logic circuit, based on the PWM signal Vpwm and the periodic signal Vq.

A description will next be given of an on-off state of the H-bridge circuit 10 during the first period φ1 through the sixth period φ6.

In the first period φ1, the logic control unit 80 turns on the first high-side transistor MH1 and the second low-side transistor ML2 and turns off the other transistors.

In the subsequent second period φ2, the logic control unit 80 turns on the first high-side transistor MH1 and turns off the other transistors. In the subsequent third period φ3, it turns on the second high-side transistor MH2 and turns off the other transistors. In the subsequent fourth period φ4, it turns on the first low-side transistor ML1 and the second high-side transistor MH2 and turns off the other transistors. In the subsequent fifth period φ5, it turns on the second high-side transistor MH2 and turns off the other transistors. In the subsequent sixth period φ6, it turns on the first high-side transistor MH1 and turns off the other transistors. Then the period returns to a first period φ1.

A description is now given of an operation of the inverter 100, according to the present embodiment, structured as above. FIGS. 12A to 12F are circuit diagrams showing the flow of electric current in the H-bridge circuit 10. FIG. 12A to FIG. 12F illustrate on-off states of transistors and states of coil current Isw in the first period φ1 to the sixth period φ6, respectively.

As shown in FIG. 12A, the first high-side transistor MH1 and the second low-side transistor ML2 turn on in the first period φ1. As a result, the coil current Isw flows through a path which includes the first high-side transistor MH1, the primary coil 12a and the second low-side transistor ML2. At this time, the switching voltage Vsw is nearly equal to the input voltage Vin. In the first period φ1, the coil current Isw increases gradually.

As shown in FIG. 12B, the second low-side transistor ML2 is turned off and the first high-side transistor MH1 only turns on in the subsequent second period φ2. As a result, by the energy stored in the primary coil 12a a regenerative current flows through a body diode of the second high-side transistor MH2. During this time, the switching voltage Vsw retains the voltage which is nearly equal to the input voltage.

Next, as shown in FIG. 12C, the second high-side transistor MH2 is switched to turn on and the first high-side transistor MH1 is turned off in the third period φ3. At this time, the coil current Isw, which was supplied from the first high-side transistor MH1 in the second period φ2, is now supplied from a body diode of the first low-side transistor ML1 via ground. The switching voltage Vsw in the third period φ3 becomes a negative value which is lower than the ground potential (0 v) by a forward voltage Vf at the body diode of the first low-side transistor ML1. The energy stored in the primary coil 12a in the first period φ1 is all transferred to the secondary coil 12b in the third period φ3, so that the coil current Isw becomes "0".

As shown in FIG. 12D, in the subsequent fourth period φ4, the first low-side transistor ML1 is switched to turn on while the second high-side transistor MH2 maintains the on state. At this time, the switching voltage Vsw is fixed to a neighborhood of the ground potential. The coil current Isw flows from right to left in a path which includes the second high-side transistor MH2, the primary coil 12a and the first low-side transistor ML1. In the fourth period φ4, the coil current Isw increases gradually.

As shown in FIG. 12E, in the subsequent fifth period φ5, the first low-side transistor ML1 is switched to turn off while the second high-side transistor MH2 maintains the on state.

As a result, the coil current Isw, which was flowing through the first low-side transistor ML1 in the fourth period φ4, now flows through a body diode of the first high-side transistor MH1. At this time, the switching voltage Vsw becomes higher than the input voltage Vin by the forward voltage Vf at the body diode thereof.

In the subsequent sixth period φ6, as shown in FIG. 12F, the first high-side transistor MH1 is switched to turn on and the second high-side transistor MH2 is turned off. At this time, the coil current Isw, which was supplied from the second high-side transistor MH2 in the second period φ5, is now supplied from ground via a body diode of the second low-side transistor ML2. The switching voltage Vsw in the sixth period φ6 becomes nearly equal to the input voltage Vin. The energy stored in the primary coil 12a in the fourth period φ4 is all transferred to the secondary coil 12b in the sixth period φ6, so that the coil current Isw becomes "0".

According to the inverter 100 of the present embodiments, the transistors constituting the H-bridge circuit 10 is driven in a manner that the current flowing through the secondary coil 12b of the transformer 12 is monitored and compared with the triangular wave signal Vosc. Thus, the on-off timing of each transistor can be flexibly adjusted by adjusting the shape of the triangular wave signal Vosc.

For example, in the present embodiment, the length of the first period φ1 and the fourth period φ4 depends on a slope at which the triangular wave signal Vosc transits from a bottom edge to a peak edge. In the triangular wave generation circuit 30 shown in FIG. 1, this slope can be varied by adjusting a charging current.

Also, in the present embodiment, the transition period from a peak edge to a bottom edge of the triangular signal Vosc is set to the third period φ3 and the sixth period φ6. The length of the third period φ3 and the sixth period φ6 can be varied by adjusting the charging current in the triangular wave generation circuit 30 of FIG. 1.

Here, the energy stored in the primary coil 12a depends on the length of the first period φ1 and the fourth period φ4. The energy stored during the first period φ1 and the fourth period φ4 is transferred to the secondary coil 12b in the third period φ3 and the sixth period φ6. Thus, the circuit can be driven highly efficiently by adjusting the shape or cycle of the triangular wave signal Vosc according to the characteristics of the transformer 12 or those of EEFL 210 to be driven.

The above-described embodiments are merely exemplary, and it is understood by those skilled in the art that various modifications to the combination of each component and process thereof are possible and such modifications are also within the scope of the present invention.

In the triangular wave generation circuit 30 shown in FIG. 1, the logic synthesis unit 42 generates the logic sum of the first comparison signal Vcmp1 and the edge detection signal SE. Then the RS flip-flop 44 is set by this logical sum, and the RS flip-flop 44 is reset by the second comparison signal Vcmp2. However, the present embodiments are not limited thereto. For example, the second comparison signal Vcmp2 and the edge detection signal SE may be logically synthesized; the RS flip-flop 44 may be reset by the output thereof; and the RS flip-flop 44 may be reset by the first comparison signal Vcmp1. In this case, the positive edge of the output voltage Vout can be synchronized with the edge detection signal SE.

In the system 400 shown in FIG. 2, one of the triangular wave generation circuits 30 is set as a master side and the other thereof is set as a slave side. However, this should not be considered as limiting. For example, the synchronization signal may be supplied to both the triangular wave generation circuits 30a and 30b in the first circuit 410 and the second circuit 420 from outside so that both circuits operate as slaves.

As a control of the H-bridge circuit 10 by the logic control unit 80, the following modifications are conceivable.

According to this modification, in the fifth period φ5 the logic control unit 80 turns off the first high-side transistor MH1 during a period from when the triangular wave signal Vosc reaches the error voltage Verr until when a predetermined first off-time Toff1 elapses. After the first off-time Toff1 has elapsed, it turns on the first high-side transistor MH1.

Further, in the second period φ2, too, the logic control unit 80 turns off the second high-side transistor MH2 during a period from when the triangular wave signal Vosc reaches the error voltage Verr until when a predetermined second off-time Toff2 elapses. After the second off-time Toff2 has elapsed, it turns on the second high-side transistor MH2. The first off-time Toff1 and the second off-time Toff2 may be set to a range of about 50 ns to about 200 ns according to the cycle of the triangular wave signal Vosc.

FIGS. 13A to 13E are timing charts showing operating states of an inverter 100 according to a modification. FIG. 13A shows an on-off state of the first high-side transistor MH1; FIG. 13B shows an on-off state of the second high-side transistor MH2; FIG. 13C shows an on-off state of the first low-side transistor ML1; FIG. 13D shows an on-off state of the second low-side transistor ML2; and FIG. 13 E shows the switching voltage Vsw.

If the second high-side transistor MH2 continues to be turned off in the fifth period φ5, the coil current Isw will flow through the body diode (parasitic diode) of the second high-side transistor MH2. As a result, a voltage drop equivalent to the forward voltage Vf occurs, thereby causing a large power loss. Consequently, according to the present modification, in the fifth period φ5, the first high-side transistor MH1 is turned on after the predetermined first off-time Toff1 has elapsed. As a result, as shown in FIG. 13E, the switching voltage Vsw drops to the input voltage Vin after the first off-time Toff1 has elapsed. At this time, the coil current Isw, which was flowing through the body diode of the first high-side transistor MH1, now flows through the first high-side transistor MH1, so that the power loss can be reduced. Also, if the first off-time Toff1 is set appropriately, it is possible to prevent the flow of a through current when the first high-side transistor MH1 and the firs low-side transistor ML1 turn on simultaneously.

Similarly, if the second high-side transistor MH2 continues to be turned off in the second period φ2, the current will flow through the body diode thereof, thus causing a large power loss. In the light of this, the second high-side transistor MH2 is turned on after the predetermined second off-time Toff2 has elapsed, thereby causing the current to flow through the second high-side transistor MH2. This can reduce the power loss.

It is only necessary that the first off-time Toff1 and the second off-time Toff2 are determined according to the characteristics of the transformer 12. It is preferable that the first off-time Toff1 and the second off-time Toff2 be set in the range of about 30 ns to about 150 ns. More preferably, if they are set in the range of 50 ns to 100 ns, the power loss can be reduced.

In the present embodiments, the components constituting the control circuit 20 may all be integrated in a single package, or part of them may be comprised of discrete components or chip components. Also, the control circuit 20 may be integrated by including the H-bridge circuit 10. Which of the components is to be integrated may be determined in consideration of the specifications, the cost, the area to be occupied, the usage and the like of the inverter 100.

In the present embodiments, the high-level and low-level settings of logical values in a logic circuit are merely exemplary, and they can be changed freely by inverting them as appropriate by an inverter or the like. For example, the logic control unit 80 may control the first period φ1 to the sixth period φ6 by inverting the peak edge and the bottom edge.

In the present embodiments, a description has been given of a case where the high-side transistors in transistors constituting the H-bridge circuit 10 are formed by N-channel MOSFETs, but P-channel MOSFETs may be used instead.

In the present embodiments, a description has been given of a case where in the light emitting apparatus 200 the inverter 100 is connected to the both ends of the EEFL 210 which is driven by a drive voltage of reversed phase. However, the present embodiments are not limited thereto. Also, a fluorescent tube to be driven is not limited to the EEFL and may be other fluorescent tubes such as CCFL. Also, a load driven by the inverter 100 according to the present embodiments is not limited to the fluorescent tube and may be applied to the driving of other various devices that require AC high voltage.

In the present embodiments, a description has been given of the inverter 100 as an application of the triangular wave generator circuit 30, but this should not be considered as limiting. The triangular wave generation circuit 30 according to the present embodiments can also be suitably used in such a case where a synchronization control is desired in a power supply apparatus (e.g., a switching regulator), a motor driver and the like, besides the inverter 100 described in the present embodiments.

While the preferred embodiments of the present invention have been described using specific terms, such description is for illustrative purposes only, and it is to be understood that changes and variations may be made without departing from the spirit or scope of the appended claims.

What is claimed is:

1. A triangular wave generation circuit, comprising:
    a capacitor whose potential is fixed at one end thereof;
    a charge-discharge circuit which charges or discharge said capacitor;
    a first comparator which compares an output voltage appearing at the other end of said capacitor with a predetermined maximum threshold voltage and which outputs a first comparison signal in response to a comparison result;
    a second comparator which compares the output voltage with a predetermined minimum threshold voltage that is lower than the maximum threshold value and which outputs a second comparison signal in response to a comparison result;
    an edge detection circuit which detects an edge of a synchronization signal, inputted externally, having approximately ½ of frequency of a triangular wave signal generated by said triangular wave generation circuit and which outputs an edge detection signal that becomes a predetermined level for each edge; and
    a charge-discharge control unit which refers to the first and the second comparison signal outputted from said first and said second comparator, respectively, and which sets said charge-discharge circuit to a discharging state when the output voltage becomes higher than the maximum threshold voltage and which sets said charge-discharge circuit to a charging state when the output voltage becomes lower than the minimum threshold voltage,
    wherein when the edge detection signal outputted from said edge detection circuit becomes the predetermined level, said charge-discharge control unit switches the charging and the discharge state of said charge-discharge circuit.

2. A triangular wave generation circuit according to claim 1, wherein said charge-discharge control circuit includes:
    a logic synthesis unit which outputs a logical sum of the first comparison signal outputted from said first comparator and the edge detection signal; and
    a flip-flop which is set or reset according an output signal of the logic synthesis unit and the second comparison signal.

3. A triangular wave generation circuit according to claim 1, wherein said charge-discharge control unit includes:
    a logic synthesis unit which outputs a logical sum of the second comparison signal outputted from said second comparator and the edge detection signal; and
    a flip-flop which is set or reset according to an output signal of the logic synthesis unit and the first comparison signal.

4. A triangular wave generation circuit according to claim 2, wherein said charge-discharge control unit includes:
    a first current source which delivers current to said capacitor; and
    a second current source which pulls current from said capacitor,
    wherein said charge-discharge control unit controls on and off of the first current source and the second current source by an output signal of the flip-flop.

5. A triangular wave generation circuit according to claim 2, further comprising a divider which divides an output signal of the flip-flop by two, wherein an output signal of the divider is outputted outside said triangular wave generation circuit as the synchronization signal.

6. An inverter, comprising:
    a transformer;
    a first high-side transistor one end of which connects to an input terminal where an input voltage is applied and the other end of which connects to a first terminal of a primary coil of said transformer;
    a first low-side transistor one end of which connects to a potential-fixed terminal where potential is fixed and the other end of which connects to the first terminal of the first terminal thereof;
    a second high-side transistor one end of which connects to the input terminal thereof and the other end of which connects to a second terminal of the primary coil thereof;
    a second low-side transistor one end of which connects to the potential-fixed terminal and the other end of which connects to the second terminal of the primary coil;
    a current-voltage conversion unit which converts current at the secondary coil of said transformer into voltage so as to be outputted as a detection voltage;
    a traingular wave generation circuit, according to which generates the triangular wave signal;
    an error amplifier which outputs an error voltage corresponding to error between the detection voltage and a predetermined reference voltage; and
    a logic control unit which controls ON and OFF of said first and said second high-side transistor and said first and said second low-side transistor, based on the error voltage and the triangular wave signal generated by said triangular wave generation circuit 7. A light emitting apparatus, comprising:

a fluorescent lamp; and two of the inverters according to claim 6, provided at both ends of said fluorescent lamp, which supply drive voltages of mutually reversed phases to said fluorescent lamp.

8. A liquid-crystal television, comprising:

a liquid-crystal panel; and a plurality of the light emitting apparatuss, according to claim 7, arranged on a backside of said liquid-crystal panel.

* * * * *